United States Patent Office 3,515,713
Patented June 2, 1970

3,515,713
REACTIVE DYESTUFFS CONTAINING 2-CHLORO-OXAZOLE, 2-CHLOROTHIAZOLE OR 2-CHLOROBENZIMIDAZOLE RINGS
Edgar Siegel, Leverkusen, and Klaus Sasse, Cologne-Stammheim, Germany, assignors to Farbenfabriken Bayer Aktiengesellschaft, Leverkusen, Germany, a German corporation
No Drawing. Filed Feb. 27, 1962, Ser. No. 176,111
Claims priority, application Germany, Mar. 10, 1961,
F 33,390
Int. Cl. C09b 62/38, 62/40, 62/42
U.S. Cl. 260—146                                13 Claims The present invention relates to novel and valuable dyestuffs; more particularly it relates to dyestuffs of the general formula

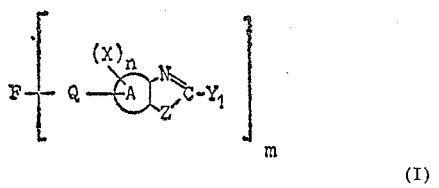

(I)

In the above formula F denotes the radical of an organic dyestuff, Q stands for a simple bond or any bridge member, A denotes a five- or six-membered carbocyclic or heterocyclic ring, X denotes hydrogen or a substituent, and $Y_1$ denotes a radical which can be split off as an anion; Z stands for —O—, —S— or >N—R, whereby R denotes hydrogen, alkyl, aralkyl or aryl, $m$ is an integer, and $n$ a whole number from 1 to 3.

It is an object of this invention to provide new valuable dyestuffs and processes for their manufacture; another object is the provision of new fibre reactive dyestuffs which are particularly useful for the dyeing and printing of cellulose-containing textile materials. A further object is the provision of new dyestuffs which exhibit outstanding wet fastness properties when dyed or printed on OH-group containing materials according to methods known for fibre reactive dyestuffs. Still another object is the provision of a method for dyeing textile materials, particularly cellulose-containing textile fibres with the novel fibre reactive dyestuffs. It is also an object of the invention to provide textile materials, particularly cellulose-containing fibres which are dyed and printed very fast to wet processing and which possess excellent general fastness properties. Other objects will become evident from the following description.

The dyestuffs of Formula I may belong to a great variety of classes, for example to the series of the metal-free or metal-containing mono- or polyazo dyestuffs, metal-free or metal-containing azaporphin dyestuffs, preferably phthalocyanine dyestuffs, of the anthraquinone, oxazine, dioxazine, triphenylmethane, nitro, azomethine, benzanthrone and dibenzanthrone dyestuffs as well as polycyclic condensation products of the latter.

In the dyestuffs of the general Formula I the radical

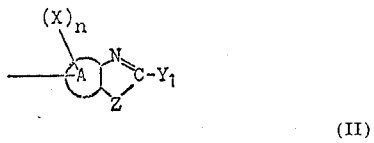

(II)

can be linked to the dyestuff molecule either directly or via any desired bridge members. Of bridge members there may be mentioned, for example, sulfonamide, sulfonylamino, carboxamide, carbonylamino, alkylene, aralkylene, arylene, amino, alkyleneamino, aralkyleneamino, aryleneamino groups and such amino groups which may be substituted by alkyl, aryl, aralkyl or acyl groups; bisacylimide groups such as bis-sulfonyl-imide groups and sulfonyl-carboxyl-imide or sulfonyl-triazinyl or pyrimidinyl-imide groups, furthermore urea and urethane groupings, heterocyclic ring systems, such as triazinyl-amino and pyrimidinylamino radicals which may contain reactive halogen atoms, as well as oxygen and sulfur atoms, and the azo groupings. Of particular importance are those dyestuffs in which the residue (II) is linked with the dyestuff via an optionally at the nitrogen atom substituted sulfonamide or carbonamide group, the —SO₂— or

group of which is bound to the nucleus A.

The bridge member may connect the radical F with the ring system A either via two or via three linking positions whereby in the latter case, for instance a five- or six-membered ring which is condensed with the nucleus A and which contains exchangeable halogen atoms (e.g. a compound of the type of Formula III) may be reacted with amino group-containing dyestuffs.

As substituents X the following may be taken into consideration inter alia: optionally substituted alkyl, aralkyl and aryl radicals, sulfonic acid, carboxylic acid and halogen substituents such as chlorine and bromine substituents, furthermore nitro, hydroxy, alkoxy, cyano, sulfone and optionally substituted sulfonamide groups, acid ester groupings such as sulfonic acid and carboxylic acid ester groups.

Of the radicals $Y_1$ which can be split off as an anion, —Cl and —Br are of special importance; however, fluorine and iodine as well as groups such as —SO₃H, —SO₂R' (R' = alkyl, aralkyl or aryl radical) or

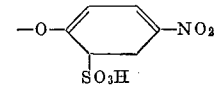

for example, are also to be mentioned.

Depending on the type of their substituents, the new dyestuffs of the Formula I can be soluble, barely soluble or even insoluble in water. The radical F may contain the substituents customary in the given dyestuffs such as sulfonic acid, carboxylic acid, possibly substituted sulfonamide, sulfone, alkylamino, aralkylamino, arylamino, acylamino, nitro, cyano, halogen, hydroxy, alkoxy, azo groupings and the like. Moreover, the dyestuffs may contain further groupings capable of fixing, such as mono- or dihalo-triazinylamino, mono-, di or tri-halopyrimidinyl-amino, esterified sulfonic acid-hydroxyalkylamide and esterified hydroxyalkyl-sulfone groups, sulfofluoride, haloalkylamino and haloacylamino, urethane, unsaturated haloalkylurethane, isocyanate groups and the like.

The new dyestuffs may be synthesized according to a great variety of preparative principles. Thus, for example, amino or amide group-containing dyestuffs or preliminary dyestuff products containing a reactive hydrogen atom at the amine or amide nitrogen, may be reacted with compounds of the general Forumla II containing in the nucleus A a reactive grouping such as a carboxylic acid halide, sulfonic acid halide or isocyanate grouping, and in the case of using preliminary dyestuff products, the latter may be transformed in suitable manner into the desired end dyestuffs. In the reverse order, the dyestuffs or preliminary dyestuff products containing reactive groupings, for example in the form of sulfonic acid halide, carboxylic acid halide, urethane, ester, haloalkyl and similar groupings, may be reacted with those compounds of the Formula II which contain in the aromatic or heterocyclic nucleus A an amino or amido grouping with reactive hydrogen, and then converted as far as preliminary dyestuff products are concerned, into the desired end dyestuffs. Especially for the production of azo group-containing dyestuffs there is the further possibility of using compounds of the general Formula II substituted in the nucleus A by a diazotizable amino group, as diazo components which are coupled in conventional manner with any coupling components and thus used for the synthesis of mono- or poly-azo dyestuffs.

When applying other methods than those described above, for instance with the formation of oxygen, sulphur or acid ester bridge groupings, a number of further dyestuffs of the general Formula I are obtained, likewise by known preparative methods. Dyestuffs in which the radical of the Formula II is directly linked with F, for example of the azo dyestuff series may be built up in such a manner that an aminaryl compound containing the aryl nucleus directly linked with the nucleus A of the compound of the general Formula II via a carbon-carbon bond, is diazotised and possibly coupled with azo components.

Depending on the number of reactive groupings to be used for the reaction and contained in the dyestuff radical or in the preliminary dyestuff products, one or more groupings of the general Formula II may be built in the dyestuffs. In the majority of cases, the number $m$ will not exceed 4, but it is also possible to synthesize dyestuffs, especially those having a higher molecular structure, with more than 4, e.g. up to 8 groupings of the Formula II.

Some of the intermediate products of the Formula II are known from the literature (cf., e.g., R. C. Elderfield, "Heterocyclic Compounds," vol. 5, 1957, and A. Weissberger, "The Chemistry of Heterocyclic Compounds," vol. 6, 1953, and K. Hofmann, Imidazole and Derivatives).

From these, some of the products suitable for the various methods of reaction can be built up by subsequent introduction of the appropriate reactive groups, for example by sulphochlorination. In general, it is however more advantageous to introduce the desired groups, for example carboxylic acid or carboxylic acid chloride, nitro, amino, amide or acylamino groups, into the nucleus A of the corresponding starting compound already before the ring closure giving the benzoxazole, -thiazole or -imidazole derivative. For this purpose it is possible, on the one hand, to start for example from benzene derivatives already containing as substituents the hetero atoms later present in the 5-ring heterocycle, to close in these compounds the two ortho-positioned substituents by means of suitable carbonic acid derivatives such as phosgene, thiophosgene, carbonic acid esters, thiocarbonic acid esters, urethanes, urea, carbon disulphide, chloroformic acid esters, thiocarbonic acid ester halides, carbamic acid chloride, thiocarbamic acid chloride, cyanogen chloride or cyanic acid to give the hetero-5-ring, and subsequently to replace the hydroxy, mercapto or alkylmercapto group thus possibly introduced into the 2-position of the 5-ring heterocycle with a halogen atom by means of, for example, chlorine, bromine, $PCl_5$, $POCl_3$, sulphuryl chloride, thionyl chloride or phosgene. Starting products suitable for these processes are for example o-hydroxy-aminobenzene-carboxylic acids, -sulphonic acids, 1-hydroxy-2,3-, -2,4- or -2,5 - diaminobenzene derivatives, 1-hydroxy - 2 - amino-nitrobenzenes, 1,2 - diamino-benzene-carboxylic acids, -sulphonic acids, triaminobenzenes (with at least two o-positioned amino groups) or derivatives thereof substituted or acylated at the amino group concerned; 1 - mercapto - 2 - aminobenzene-carboxylic acids, -sulphonic acids or diaminomercaptobenzenes with an amino group in the ortho-position to the mercapto group and also 1-mercapto-2-aminonitrobenzenes.

On the other hand, the ring closure to form the 5-ring heterocycle can also be combined with the introduction of one of the two hetero atoms. For example, 4-chloro-3-nitrobenzoic acid can be condensed with carbon disulphide and sodium hydrogen sulphide in one step to give 2 - mercaptobenzthiazole-5-carboxylic acid; phenyl-mustard oil can be converted directly into 2-mercaptobenzthiazole by heating with sulphur. In some cases, the conversion of the hydroxyl, mercapto or alkylmercapto group in the 2-position of the 5-ring heterocycle into a halogen atom can also be combined in one step with a likewise desirable conversion of a substituent contained in the nucleus A, for example the conversion of a carboxylic acid group into a carboxylic acid chloride group, of a sulphonic acid group into a sulphonic acid chloride group, or of an amino group into an isocyanate group. Thus 2-chlorobenzoxazole - 5 - carboxylic acid chloride can be produced by reacting 4-hydroxy-3-aminobenzoic acid with thiophosgene to give 2-mercaptobenzoxazole-5-carboxylic acid and subsequent treatment with phosphorus pentachloride.

Among the great number of dyestuffs obtainable according to the present process, those products are especially easily obtainable which are derived from amino group-containing azo dyestuffs of the benzene-azo-benzene, benzene-azo-naphthalene, naphthalene-azo-naphthalene, benzene-azo-aminopyrazole and -pyrazolone series, the heteroazo-aryl series and the aminoanthraquinone series with amino groups linked in the nuclear position or externally, by reaction with compounds of the Formula II containing a reactive group in the nucleus A, for example a carboxylic acid chloride, sulphonic acid chloride, isocyanate, urethane, halotriazinylamino or halopyrimidinylamino group. Likewise, an amino group-containing dyestuff or dyestuff intermediate can be coupled in a simple manner with an amino group-containing 2-chloro-benzoxazole, -thiazole or -imidazole by means of polyfunctional acylating agents, for example by reacting the amino group-containing starting components with phosgene, aliphatic or aromatic dicarboxylic acid halides, cyanuric halides or di-, tri- or tetrahalopyrimidine.

A special case of linking the radical with the Formula II with the dyestuff is attained by starting from condensed heterocyclic systems which contain several, preferably two, thiazole, oxazole or imidazole rings with radicals Y splittable as anions in the 2-position, and by exchanging therein one of the radicals splittable as anion, preferably chlorine or bromine, for the radical of an amino group-containing dyestuff or dyestuff intermediate. Suitable condensed heterocyclic systems are, inter alia,

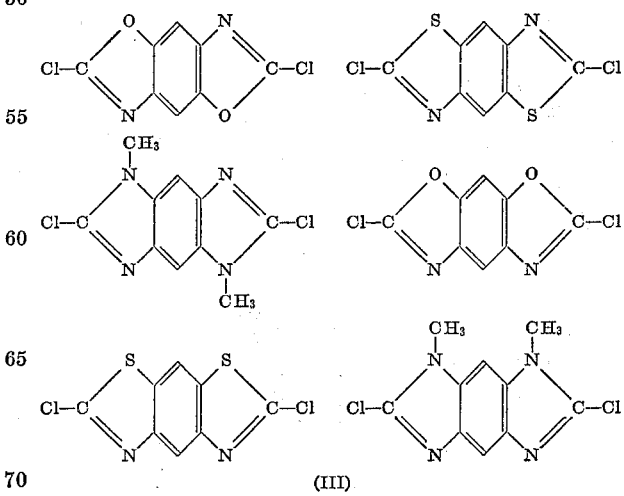

(III)

or mixed heterocyclic compounds of analogous type.

It will be understood that a great number of other starting components can be used in the preparation of the novel dyestuffs.

The new dyestuffs are valuable products which are excellently suitable for various purposes of application. As water-soluble compounds they are of special interest for the dyeing of nitrogen-containing and hydroxyl group-containing textile materials, especially of native and regenerated cellulose, wool, silk, synthetic polyamide and polyurethane fibres. On account of the reactive halogen substituents in the oxazole, thiazole or imidazole radical, the products are particularly suitable as reactive dyestuffs for the dyeing of cellulose materials according to the techniques known for this purpose.

For the dyeing of natural and regenerated cellulose the dyestuffs are preferably used in an aqueous solution which may be treated with substances having an alkaline reaction such as alkali metal hydroxide or alkali metal carbonate or with compounds convertible into substances of alkaline reaction such as alkali metal bicarbonate. Further auxiliaries may be added to the solution but they should not react with the dyestuffs in an undesirable manner. Additives of this kind are for example surface-active substances such as alkyl sulfates, substances preventing migration of the dyestuff, dyeing adjuvants such as urea which is to improve the solubility and fixation of the dyestuff, or inert thickening agents such as oil-in-water emulsions, tragacanth, starch, alginate or methyl cellulose.

The solutions or pastes thus prepared are applied to the material to be colored, for example by padding on the foulard (short bath) or by printing, and subsequently heated to an elevated temperature, preferably 40–150° C., for some time. Heating can be effected in the hot flue, in a steaming apparatus, on heated rollers or by introduction into heated concentrated salt baths.

When using a padding or dyeing liquor without alkali the colored dry material is subsequently passed through an alkaline solution to which sodium chloride or Glauber's salt are added. The addition of salt prevents migration of the dyestuff from the fibre.

The material to be dyed can also be pretreated with one of the aforesaid acid-binding agents, subsequently treated with a solution or paste of the dyestuff and, finally, fixed at an elevated temperature as described above.

In the so-called cold pad batch process, the subsequent heating of the padded fabric can be dispensed with by storing the fabric at room temperature for 4–20 hours. In this process sodium carbonate solution is preferably used as alkali.

For dyeing from a long liquor, the material is introduced into an aqueous solution of the dyestuff (goods-to-liquor ratio 1:5 to 1:40) at room temperature and dyed, if desired while raising the temperature up to 85° C. for 40–90 minutes with the addition in portions of salt, for example sodium sulfate, and subsequently of alkaline substances for example sodium phosphates, sodium carbonate or alkalies.

After fixation of the dyed material is rinsed hot and, if required, finally soaped, thereby removing insufficiently fixed dyestuff residues. Dyeings of excellent fastness to wet processing are thus obtained.

For printing materials containing hydroxyl groups, a printing paste is used consisting of the dyestuff solution, a thickening agent, such as sodium alginate, and a compound having alkaline reaction or dissociating alkali on heating, such as sodium carbonate, sodium phosphate, potassium carbonate, potassium acetate or sodium and potassium bicarbonate, the printed material is rinsed and, if desired, finally soaped.

When the dyestuffs, in particular azo dyestuffs, contain groupings forming metal complexes, the fastness properties of the dyeings and prints can in many cases be improved by an after-treatment with metal-yielding agents such as copper salts, for example copper sulfate; chromium, cobalt and nickel salts such as chromium acetate, cobalt sulfate or nickel sulfate.

Textile materials containing amide groups such as wool, silk, synthetic polyamide and polyurethane fibres are in general dyed in the acidic to neutral range according to the dyeing methods conventionally used for this purpose whereby a final increase of the pH value of the dyebath to, for example pH 6.5 to 8.5 is sometimes of advantage.

The dyestuffs are applied to a synthetic polyamide fabric, for example, as solutions or, preferably, in dispersed form and subsequently after-treated together with acid-binding agents in preferably small amounts, such as sodium carbonate. Especially advantageous results are achieved with dyestuffs which are insoluble or barely soluble in water. These are worked up according to conventional techniques and with the addition of known auxiliaries into a dyestuff dispersion and used as such in the dye- or padding-liquor or in a printing paste. Auxiliaries suitable for this application are inter alia compounds preventing the migration of the dyestuff on the fibre such as cellulose ether, alkali metal chlorides and sulfates; wetting agents such as condensation products from ethylene oxide and fatty alcohols or phenols, sulfonated fatty alcohols, solvents such as thiodiglycol; further thickeners such as starch, tragacanth, alginate thickening, gum arabic etc.

After-treatment of the dyeings impregnations and prints obtained are polyamide fibre fabrics is preferably carried out at a temperature of 50–110° C. for 5–60 minutes. In the case where the dyestuffs employed contain groupings forming metal complexes, the fastness properties of the dyeings will sometimes be improved by treating the dyeings with metal-yielding agents such as copper salts, for example copper sulfate, or chromium, cobalt and nickel salts such as chromium acetate, cobalt sulfate or nickel sulfate.

The dyeings and prints obtainable with the new dyestuffs on cellulosic material are, in general, distinguished by good to very good fastness properties, especially by excellent fastness to wet processing, such as to washing to boiling soda and furthermore to water, to rubbing and brushing, to light and in some instances to chlorine and to peroxide. The dyeings and prints on woolen fabrics possess very good fastness to washing, milling, seawater, hot water and to light. Dyeings and prints on synthetic polyamide fabrics are distinguished by very good fastness to water, washing and light whereas dyeings and prints on synthetic polyester materials, particularly on polyethylene terephthalate, exhibit good fastness to sublimation, to washing and to light.

The following examples are given for the purpose of illustrating the invention, the parts being parts by weight if not otherwise stated.

EXAMPLE 1

28 parts by volume of conc. hydrochloric acid are added to a solution of 34.7 parts of 2-aminonaphthalene-4,8-disulfonic acid sodium salt and 7 parts of sodium nitrite in 300 parts of water while cooling with ice, and the mixture is stirred at 0–10° C. for ½ hour. After removing the excess nitrous acid, 10.7 parts of 3-aminotoluene dissolved in 10 parts by volume of conc. hydrochloric acid and 150 parts of water are added and coupling is completed by buffering the acid reaction mixture to pH 3–5. The resultant aminoazo dyestuff is salted out, filtered off with suction, washed and then redissolved in 700 parts of water with the addition of sodium hydroxide solution at pH 7. The aqueous solution is then treated with 22 parts of finely powdered 2-chlorobenzoxazole-5-carboxylic acid chloride (M.P. 111-112° C.) and stirred at 40–50° C., until free amino groups can no longer be detected by diazotization, while the liberated hydrochloric acid is continuously buffered by adjusting the pH of the mixture to 3–6 with sodium carbonate solution. The resultant dyestuff of the formula

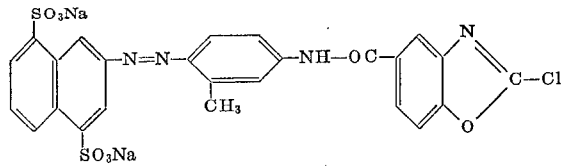

is salted out with 150 parts of sodium chloride, pressed off, washed and dried under vacuum at 40–50° C. It is a yellow powder which dissolves in water with a yellow colour.

When a cellulose fabric is printed with a printing paste containing per kilogram 15 g. of this dyestuff, 100 g. of urea, 300 ml. of water, 500 g. of alginate thickening (60 g. of sodium alginate per kg. of thickening) and 10 g. of sodium carbonate and made up with water to 1 kg. then dried, steamed at 105° C. for 8 minutes, rinsed with hot water and soaped with boiling, there is obtained an intense reddish yellow print of good fastness to washing and light.

EXAMPLE 2

Into a solution of 36.5 parts of the sodium salt of 1-amino-8-hydroxynaphthalene-3,6-disulphonic acid in 100 parts of water, 22 parts of finely powdered 2-chlorobenzoxazole-5-carboxylic acid chloride are introduced with good stirring and the mixture is stirred at 30–40° C. while continuously buffering the liberated hydrochloric acid by adjusting the pH of the mixture to 3–6; stirring is continued until free amino groups are no longer indicated. The resultant dyestuff intermediate, after dilution with 500 parts of water and addition of 12 parts of sodium carbonate, is coupled at 5–10° C. with 17.5 parts of diazotized 2-amino-benzene-sulphonic acid dissolved in 200 parts of water. The dyestuff formed at a pH of 6–7 and having the formula

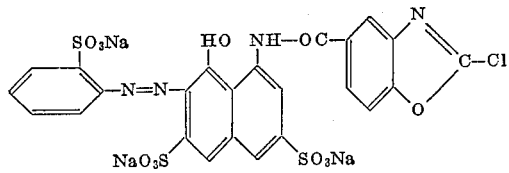

is salted out with 150 parts of sodium chloride, filtered off with suction, washed and dried at 40–50° C. under vacuum. The dyestuff forms small red needles having a metallic lustre and dissolving easily in water with a red colour.

A fabric of cotton or regenerated cellulose can be dyed with this dyestuff as follows:

50 g. of cotton skein are dyed in 1 litre of a dyebath containing 1.5 g. of the above dyestuff by raising the temperature from 20° C. to about 80° C. within 30 minutes while adding 50 g. of sodium chloride in several portions, subsequently adding 20 g. of trisodium phosphate and treating at this temperature for 60 minutes. After rinsing, soaping at the boil and drying, a clear bluish red dyeing of good fastness to wet processing, rubbing and light is obtained.

The process can also be carried out by impregnating a cotton fabric with a solution of 20–25° C. containing per litre of liquor 20 g. of the above dyestuff and 0.5 g. of a non-ionic wetting agent (e.g. a polyethoxylated oleyl alcohol) as well as 150 g. of urea and 15 g. of sodium bicarbonate, and subsequently squeezing the fabric between two rubber rollers to a moisture content of about 100%. After intermediate drying at 50–60° C., the fabric is heated to 140° C., the resultant dyeing thoroughly rinsed with hot water and treated at the boil for 20 minutes with a solution containing per litre 5 g. of Marseille soap and 2 g. of sodium carbonate. After rinsing and drying, there is obtained an intense bluish red dyeing of good fastness to wet processing, rubbing and light.

Similar results are also obtained by proceeding according to the first-mentioned method of application (dyeing from a long bath), but carrying out the salt addition and the one hour's after-treatment with trisodium phosphate at room temperature (20–30° C.) instead of at 80° C. The same is true of the last-mentioned working method (padding dyeing) which, likewise with 15 g. of sodium bicarbonate or 10 g. of sodium carbonate and by storing the cellulose fabric squeezed to a moisture content of 100% at room temperature for 5 to 20 hours instead of intermediate drying and heating to 140° C., also yields red dyeings with the fastness properties mentioned above.

In the following table the starting components are listed from which, in analogy to the aforesaid process or also by reacting the corresponding aminoazo dyestuffs with the reactive components further dyestuffs are obtained which can be dyed or printed on cellulose materials according to one of the processes described above in the shades as indicated:

| Example No. | Diazo component | Coupling component | Reactive component | Shade |
|---|---|---|---|---|
| 3 | 1-aminobenzene-2-sulphonic acid | 1-amino-8-hydroxy-naphthalene-3,6-disulphonic acid. | 2-chlorobenzthiazole-5-carboxylic acid chloride, | Red. |
| 4 | do | do | 2-chlorobenzoxazole-5-sulphochloride | Red. |
| 5 | 1-amino-4-methyl-benzene-2-sulfonic acid. | do | 2-chloro-benzoxazole-5-carboxylic acid chloride. | Red. |
| 6 | 1-aminobenzene-2,5-disulfonic acid | 1-(3'-aminobenzoyl-amino)-8-hydroxy-naphthalene-3,6-disulfonic acid. | do | Red. |
| 7 | 1-aminobenzene-2-sulfonic acid | 2-amino-5-hydroxy-naphthalene-7-sulfonic acid. | do | Orange. |
| 8 | 1-amino-4-acetyl-aminobenzene-6-sulfonic acid. | do | do | Scarlet. |

EXAMPLE 9

Into a solution of 21 parts of the sodium salt of 1,3-diaminobenzene-6-sulfonic acid in 100 parts of water there are introduced with good stirring 22 parts of finely powdered 2-chlorobenzoxazole-5-carboxylic acid chloride and the mixture is stirred at 30–40° C. While continuously buffering the liberated hydrochloric acid by adjusting the pH value of the reaction mixture to 3–6, until a sample, upon diazotization and coupling with 1-hydroxynaphthalene-4-sulfonic acid, yields a uniform yellowish red shade. After the addition of ice the resultant dyestuff intermediate is directly diazotized with 7 parts of sodium nitrite and 28 parts of concentrated hydrochloric acid and subsequently combined with a previously prepared solution of 47 parts of the sodium salt of 1-benzoylamino-8-hydroxynaphthalene-3,6-disulfonic acid and 12 parts of sodium carbonate in 200 parts of water, whereupon coupling takes place to give the dyestuff of the formula

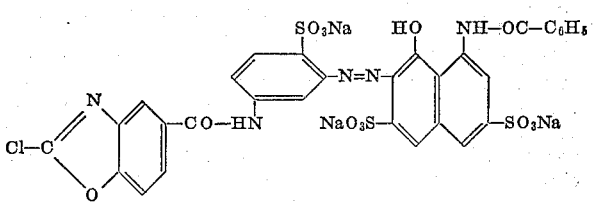

which is salted out, filtered off with suction, washed and dried at 40–50° C. under vacuum. The dyestuff easily dissolves in water with a red colour and yields clear bluish red dyeings and prints on cellulose materials according to one of the processes described above.

When a fabric of synthetic polyamide fibres is dyed at the boil for an hour in a goods-to-liquor ratio of 1:30 in a bath containing 2% of the dyestuff mentioned above (referred to the weight of the material) and 2% of formic acid (referred to the weight of the material to be dyed), there is obtained, after rinsing, a clear bluish red dyeing of good fastness to wet processing.

In the table following below there are given the shades and the pH value of the coupling medium of dyestuffs which can be produced in analogy to the instructions of Example 9 from a diazo component containing a further amino group, from a coupling component and a reactive component linkable with the free amino group contained in the diazo component. The processes mentioned above can be used for dyeing and printing cellulose materials with the dyestuffs of this table.

EXAMPLE 14

96 parts (referred to 100% material) of the copper-phthalocyanine tetrasulphochloride freshly prepared in usual manner by the reacting of chlorosulphonic acid and thionyl chloride with copper phthalocyanine, or of the isomeric copper-phthalo-cyanine tetrasulphochloride synthesized from 1-sulphobenzene-3,4-dicarboxylic acid via the corresponding copper-phthalo-cyanine-tetrasulphonic acid, are suspended in the form of the moist and thoroughly washed filter cake in 500 parts of water and 500 parts of ice, a solution of 50 parts of the sodium salt of 1,3-diaminobenzene-4-sulphonic acid in 500 parts of water is added and the pH value adjusted to 8.5 with sodium carbonate. The suspension is stirred at room temperature for 24 hours and the pH is maintained at 8.5 by the continuous addition of sodium carbonate. The resultant condensation product is precipitated at pH 1–2 by the addition of sodium chloride, filtered off with suction, washed and then redissolved neutral in 1000 parts of water. To the blue solution there is added dropwise with intense

| Example No. | Diazo component | Coupling component | Reactive component | pH of the coupling medium | Shade |
|---|---|---|---|---|---|
| 10 | 1,3-diaminobenzene-4-sulphonic acid. | 1-(3'-sulphophenyl)-3-methyl-5-pyrazolone. | 2-chloro-benzthiazole-5-carboxylic acid chloride. | 6 | Yellow. |
| 11 | do. | 1-(2', 5'-dichloro-4'-sulphophenyl)-3-methyl-pyrazolone-5. | 2-chlorobenzoxazole-5-carboxylic acid chloride. | 6 | Do. |
| 12 | do. | 2-acetylamino-5-hydroxynaphthalene-7-sulphonic acid. | do. | 6–7 | Orange. |

EXAMPLE 13

51.6 parts of the dyestuff of the formula

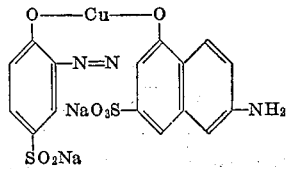

obtained by diazotization of 1-hydroxy-2-aminobenzene-4-sulphonic acid and coupling with 2-amino-5-hydroxy-naphthalene-7-sulphonic acid in water/pyridine in the presence of sodium carbonate and subsequent treatment with a copper-yielding agent, are dissolved in 1500 parts of water at pH 7. Portions of 22 parts of finely powdered 2-chlorobenzoxazole-5-carboxylic acid chloride are introduced at 30–40° C. with good stirring and the liberated hydrochloric acid is continuously buffered by adjusting the pH of the mixture to 3–6 with sodium carbonate solution. When free amino groups are no longer detectable the resultant reactive dyestuff of the formula

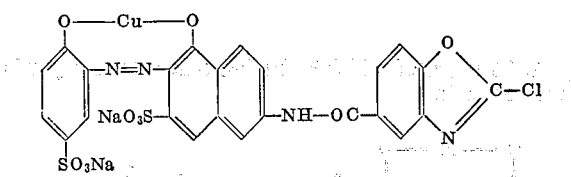

is salted out, pressed off, washed and dried under vacuum at 40–50° C. Fabrics of cellulose materials can be dyed or printed with this dyestuff according to one of the processes mentioned above in ruby shades fast to wet processing, rubbing and light.

stirring a solution of 67 parts of 2-chlorobenzoxazole-5-carboxylic acid chloride in 300 parts of benzene and the mixture is stirred at 30–40° C. while continuously buffering the liberated hydrochloric acid by keeping the pH by the reaction mixture at 4–6 with sodium carbonate solution, until free amino groups are no longer detectable. The resultant reactive dyestuff of the formula

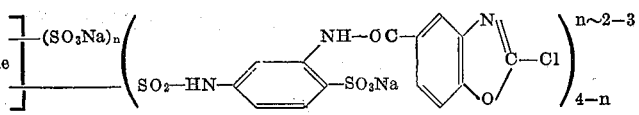

is salted out, washed and dried at 30–40° C. under vacuum. It is a dark blue powder which dissolves in water with a blue colour and dyes cotton and regenerated cellulose according to one of the dyeing or printing processes mentioned above in clear blue shades of good fastness to wet processing, rubbing and light.

It is also possible to use, instead of 96 parts of copper phthalocyanine tetrasulphochloride, 87 parts (referred to 100% material) of the copper- or nickel-phthalocyanine trisulphochloride obtainable by the reaction of chlorosulphonic acid with copper- or nickel-phthalocyanine, in the form of the moist filter cake thoroughly washed with ice-water, the procedure otherwise being the same as in Example 12; reactive dyestuffs dyeing in clear blue shades are thus also obtained.

When starting from 4', 4'', 4''', 4''''-tetraphenyl-Cu-phthalocyanine, there is obtained, after sulphochlorination, reaction with 1,3- phenylenediamine-4-sulphonic acid and acylation with 2-chlorobenzoxazole-5-carboxylic acid chloride, a reactive dyestuff which dyes cellulose materials in the presence of acid-binding agents in clear green shades fast to wet processing and light.

EXAMPLE 15

53.5 parts of the aminoanthraquinone dyestuff obtained by reaction of 1-amino-4-bromoanthraquinone-2-sulphonic acid with 1,3-diaminobenzene-4-sulphonic acid, are dissolved in 700 parts of water, 22 parts of finely powdered 2-chlorobenzoxazole-5-carboxylic acid chloride are introduced at 20–30° C. with good stirring and a pH of 3–6 is maintained by the continuous addition of sodium carbonate solution. When free amino groups are no longer detectable, the resultant dyestuff of the formula

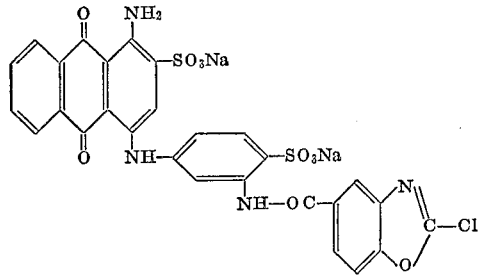

is salted out, filtered off with suction, washed and dried at 40° C. under vacuum. The dyestuff dyes cotton and regenerated cellulose according to one of the processes mentioned above in blue shades fast to wet processing, rubbing and light.

What is claimed is:

1. A dyestuff of the formula:

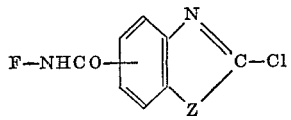

wherein F stands for the residue of a water-soluble organic dyestuff selected from the group consisting of an azo, anthraquinone, and phthalocyanine dyestuff and Z stands for a member selected from the group consisting of —O— and —S—.

2. A dyestuff of the formula

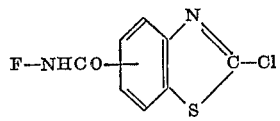

wherein F stands for the residue of a water-soluble organic azo dyestuff.

3. A dyestuff of the formula

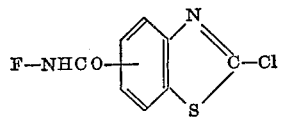

wherein F stands for the residue of a water-soluble organic anthraquinone dyestuff.

4. A dyestuff of the formula

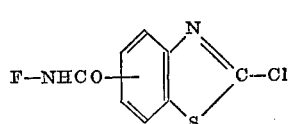

wherein F stands for the residue of a water-soluble organic phthalocyanine dyestuff.

5. The dyestuff which in the free acid state corresponds to the formula

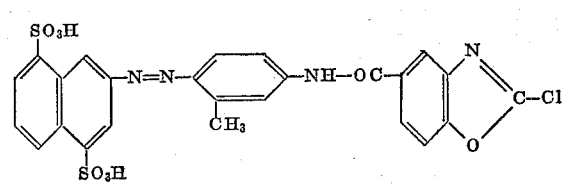

6. The dyestuff which in the free acid state corresponds to the formula

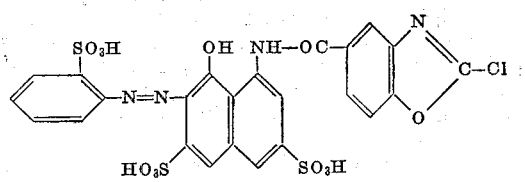

7. The dyestuff which in the free acid state corresponds to the formula

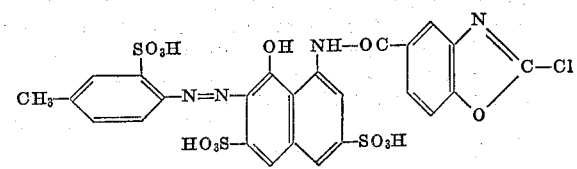

8. The dyestuff which in the free acid state corresponds to the formula

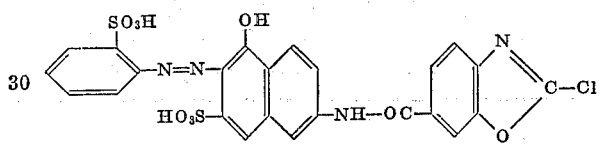

9. The dyestuff which in the free acid state corresponds to the formula

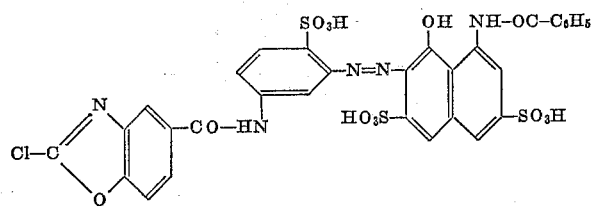

10. The dyestuff which in the free acid state corresponds to the formula

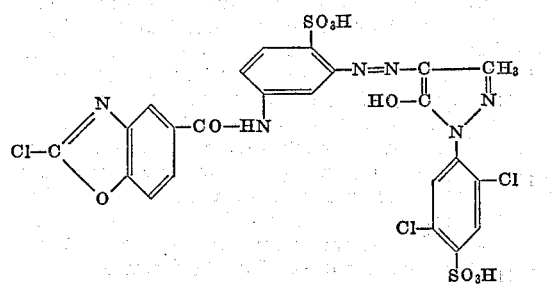

11. The dyestuff which in the free acid state coresponds to the formula

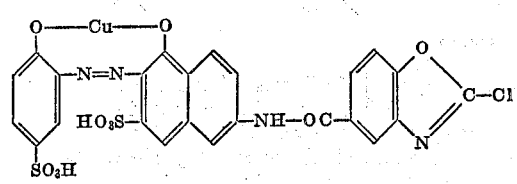

12. The dyestuff which in the free acid state corresponds to the formula
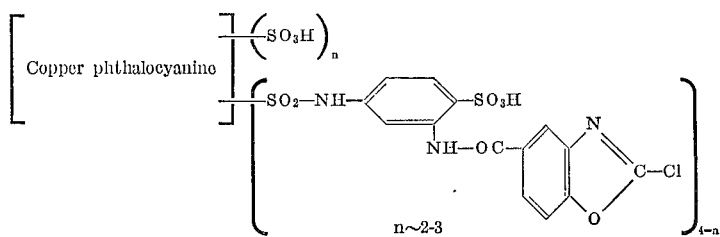
13. The dyestuff which in the free acid state corresponds to the formula
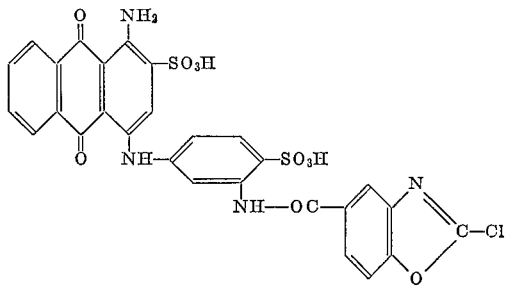
References Cited
FOREIGN PATENTS
559,354   1/1958   Belgium.
FLOYD D. HIGEL, Primary Examiner
U.S. Cl. X. R.
260—158, 157, 304, 299, 153, 154, 306, 309.2, 307.5; 8—43, 62, 41, 42, 71, 63, 50, 51